United States Patent
Klein et al.

(10) Patent No.: US 10,768,804 B2
(45) Date of Patent: Sep. 8, 2020

(54) GESTURE LANGUAGE FOR A DEVICE WITH MULTIPLE TOUCH SURFACES

(71) Applicant: Microsoft Technology Licensing, LLC, Redmond, WA (US)

(72) Inventors: Christian Klein, Duvall, WA (US); Gregg Robert Wygonik, Duvall, WA (US); Ricardo A. Espinoza Reyes, Redmond, WA (US); Raymond Quan, Seattle, WA (US); Sophors Khut, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 234 days.

(21) Appl. No.: 15/257,179

(22) Filed: Sep. 6, 2016

(65) Prior Publication Data

US 2018/0067638 A1 Mar. 8, 2018

(51) Int. Cl.
*G06F 3/0488* (2013.01)
*G06F 1/16* (2006.01)
(Continued)

(52) U.S. Cl.
CPC ........ *G06F 3/04883* (2013.01); *G06F 1/1652* (2013.01); *G06F 1/1692* (2013.01);
(Continued)

(58) Field of Classification Search
CPC .... G06F 1/1692; G06F 1/1652; G06F 3/0346; G06F 3/0416; G06F 3/04886;
(Continued)

(56) References Cited

U.S. PATENT DOCUMENTS 6,331,840 B1* 12/2001 Nielson ................ G06F 3/0488
345/1.1
7,236,159 B1 6/2007 Siversson
(Continued)

FOREIGN PATENT DOCUMENTS

CN 101799729 A 8/2010
EP 2980692 A1 2/2016
(Continued)

OTHER PUBLICATIONS

"Extended 3D Object Manipulation: Gestures on Mobile Devices with Double-sided Multi-touch Input", In Proceedings of the SIGCHI Conference on Human Factors in Computing Systems, Apr. 4, 2009, 10 pages.
(Continued)

*Primary Examiner* — Quoc A Tran

(57) ABSTRACT

A gesture language for a device with multiple touch surfaces is described. Generally, a series of new touch input models is described that includes touch input interactions on two disjoint touch-sensitive surfaces. For example, a mobile device can include a primary display on a "front" side of the device, and a secondary display or touch-sensitive surface on the "back" side of the device, such as a surface that is opposite the primary display. Accordingly, the gesture language can include a series of "back touch" interactions with the touch-sensitive surface on the backside of the device. Example interactions include direct and indirect touch input on the back side, as well as simultaneous touch input on both sides of the device.

20 Claims, 9 Drawing Sheets

(51) Int. Cl.
   G06F 3/0346    (2013.01)
   G06F 3/041     (2006.01)
   G06F 3/0484    (2013.01)
   G06F 3/01      (2006.01)
   G06F 17/00     (2019.01)

(52) U.S. Cl.
   CPC .......... G06F 3/0346 (2013.01); G06F 3/0416 (2013.01); G06F 3/04845 (2013.01); *G06F 3/017* (2013.01); *G06F 3/0488* (2013.01); *G06F 3/04886* (2013.01); *G06F 2203/04808* (2013.01)

(58) Field of Classification Search
   CPC .... G06F 3/0488; G06F 3/017; G06F 17/2247; G06F 3/04883; G06F 3/04845; G06F 2203/04808
   See application file for complete search history.

(56) References Cited

U.S. PATENT DOCUMENTS

| | | | |
|---|---|---|---|
| 8,446,370 | B2 | 5/2013 | Zadesky et al. |
| 9,311,724 | B2 | 4/2016 | Luo |
| 2010/0182247 | A1* | 7/2010 | Petschnigg ........... G06F 1/1647 345/173 |
| 2011/0291946 | A1 | 12/2011 | Mann et al. |
| 2012/0081307 | A1* | 4/2012 | Sirpal .................. G06F 1/1616 345/173 |
| 2013/0141373 | A1 | 6/2013 | Takuma et al. |
| 2013/0222276 | A1* | 8/2013 | Kim .................... G06F 3/0488 345/173 |
| 2014/0049476 | A1 | 2/2014 | Bragin |
| 2014/0101578 | A1* | 4/2014 | Kwak ................ G06F 3/04883 715/761 |
| 2014/0375596 | A1 | 12/2014 | Kim et al. |
| 2016/0044152 | A1* | 2/2016 | Sirpal .................. G06F 1/1616 455/413 |
| 2016/0077627 | A1 | 3/2016 | Vecera et al. |
| 2016/0085269 | A1* | 3/2016 | Yeh .......................... G06F 3/041 345/173 |

FOREIGN PATENT DOCUMENTS

| | | | |
|---|---|---|---|
| GB | 2344905 | A | 6/2000 |
| JP | 2003330611 | A | 11/2003 |
| TW | 201537440 | A | 10/2015 |
| WO | 2010008152 | A2 | 1/2010 |
| WO | 2014043830 | A1 | 3/2014 |

OTHER PUBLICATIONS

Lavie, Assaf, "Dual-touch smartphone design concept", Published on: Apr. 25, 2014 Available at: http://blog.assaflavie.com/touch/.

Savov, Vlad, "Sony's next PSP, codenamed NGP", Published on: Jan. 27, 2011 Available at: https://www.engadget.com/2011/01/27/the-sony-psp2/#/.

"Doogee DG800 SmartPhone Android 4.4 MTK6582 Quad Core 45 inch 1GB 8GB 13MP camera back touch White", Published on: Apr. 28, 2014 Available at: http://www.doogeemobile.com/doogee-dg800-smartphone-android-4-4-mtk6582-4-5-inch-1gb-8gb-13mp-camera.html.

Cha, Bonnie, "Motorola Backflip—platinum silver (AT&T)" Published on: May 14, 2015 Available at: http://www.cnet.com/products/motorola-backflip-platinum-silver-at-t/.

"Oppo N1", Retrieved on: Jun. 17, 2016 Available at: http://oppostyle.com/n1/44-n1-white.html.

Newman, Jared, "YotaPhone Gets Serious with Rear E-Ink Touchscreen, Better Specs", Published on: Feb. 24, 2014 Available at: http://techland.time.com/2014/02/24/yotaphone-gets-serious-with-rear-e-ink-touchscreen-better-specs/.

"International Search Report and Written Opinion Issued in PCT Application No. PCT/US2017/048777", dated Nov. 15, 2017, 11 Pages.

* cited by examiner

GESTURE LANGUAGE FOR A DEVICE WITH MULTIPLE TOUCH SURFACES

BACKGROUND

Mobile devices provide today's user with a variety of different functionality, and in many instances allow the user to directly interact with objects displayed via touch-sensitive display devices. A typical gesture language, however, may be inefficient for devices having multiple touch-sensitive surfaces given the ergonomics of holding and interacting with such a device. This can detract from user enjoyment and lead to user frustration when using these types of devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A gesture language for a device with multiple touch surfaces is described. Generally, a series of new touch input models is described that includes touch input interactions on two disjoint touch-sensitive surfaces. For example, a mobile device can include a primary display on a "front" side of the device, and a secondary display or touch-sensitive surface on the "back" side of the device, such as a surface that is opposite the primary display. Accordingly, the gesture language can include a series of "back touch" interactions with the touch-sensitive surface on the backside of the device. Example interactions include direct and indirect touch input on the back side, as well as simultaneous touch input on both sides of the device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Techniques for a gesture language on a device with multiple touch surfaces are described. Generally, techniques described herein allow touch input interactions with two disjoint surfaces of a mobile device. In implementations, the two surfaces face opposite directions from one another, such that the two surfaces have a front-to-back relationship, at least temporarily. In this way, the back surface faces away from a user while the user is looking at the primary display. Such a device is aware of touch input on both sides of the device and is able to correlate the two input streams. This is not to be construed as limiting, however, and techniques described herein can be employed in devices that have two or more input surfaces that are not "back-to-front" in relation to one another, but can be positioned adjacent one another at different angles.

By having multiple touch surfaces, devices described herein enable a range of interaction models that take advantage of touch input on a touch surface that is not a primary touch surface, or that take advantage of correlated touch input on multiple sides of the device. These interaction models can be complementary to one another, selected based on user preferences, selected based on a current context of the device (e.g., based on which shell user interface or application is currently active), and so on.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
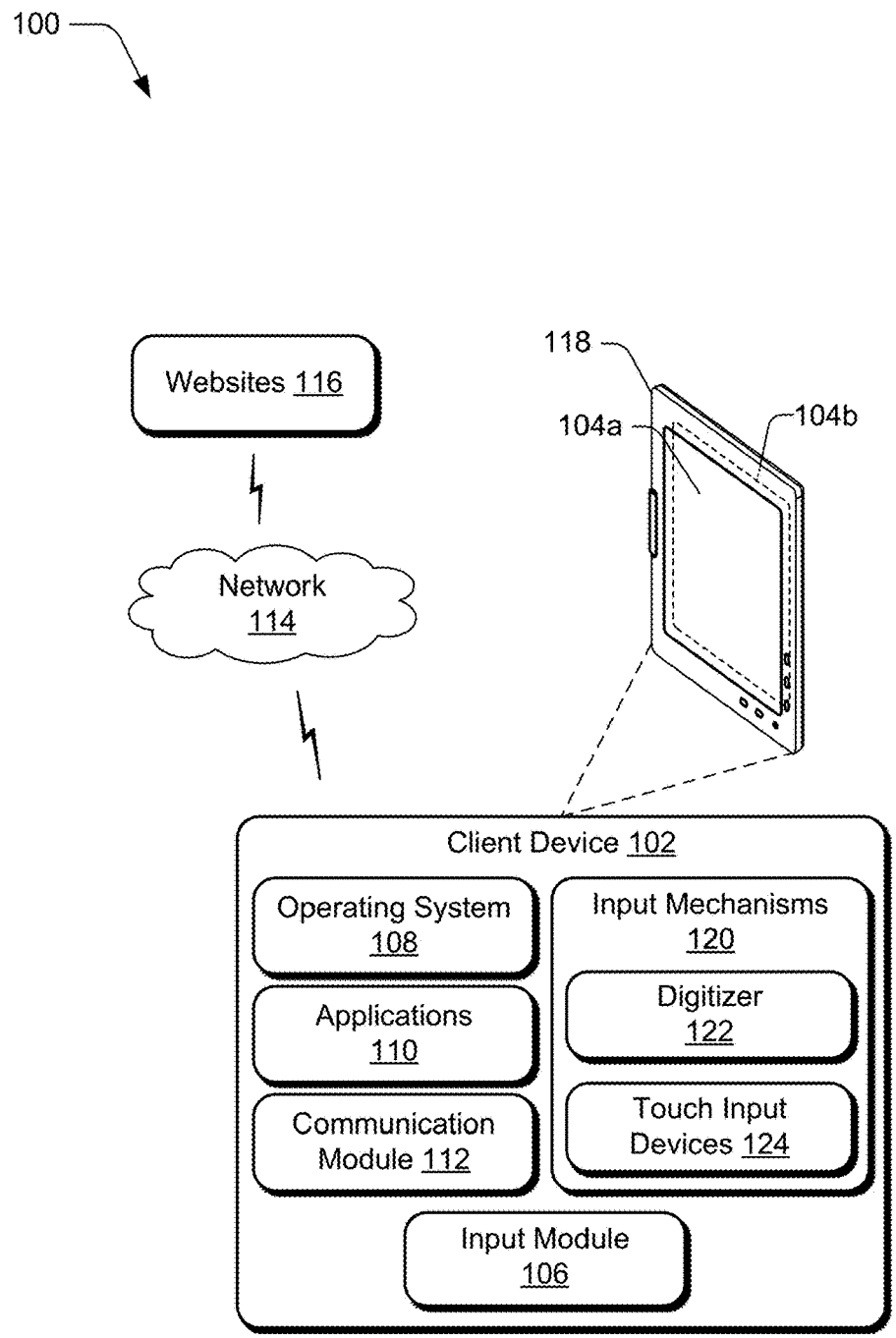
FIG. 1 is an illustration of an environment in an example implementation that is operable to employ the techniques described herein in accordance with one or more embodiments.

FIG. 1 is an illustration of an environment 100 in an example implementation that is operable to employ techniques for a gesture language for a device with multiple touch surfaces discussed herein. Environment 100 includes a client device 102 which can be configured for mobile use, such as a mobile phone, a tablet computer, a wearable device, a handheld gaming device, a media player, and so on. The client device 102 includes a touch surface 104a and a touch surface 104b that are disjoint from one another, and an input module 106 configured to process input received via one or more of the touch surfaces 104a, 104b according to techniques described herein. Generally, the touch surfaces 104a, 104b are disjoint from one another since they are not adjacent one another and/or directly connected to one another. The touch surface 104a, for instance, is positioned on a front surface of the client device 102, and the touch surface 104b is positioned on a rear surface of the client device 102. In at least some alternative implementations, disjoint touch surfaces may represent touch surfaces that are connected to one another yet may be oriented at different angles and/or planar orientations relative to each other.

While implementations presented herein are discussed in the context of a mobile device, it is to be appreciated that various other types and form factors of devices may be utilized in accordance with the claimed implementations. Thus, the client device 102 may range from full resource devices with substantial memory and processor resources, to a low-resource device with limited memory and/or processing resources. An example implementation of the client device 102 is discussed below with reference to FIG. 9.

The client device 102 includes a variety of different functionalities that enable various activities and tasks to be performed. For instance, the client device 102 includes an operating system 108, applications 110, and a communication module 112. Generally, the operating system 108 is representative of functionality for abstracting various system components of the client device 102, such as hardware, kernel-level modules and services, and so forth. The operating system 108, for instance, can abstract various components (e.g., hardware, software, and firmware) of the client device 102 to enable interaction between the components and applications running on the client device 102.

The applications 110 are representative of functionality for performing different tasks via the client device 102. In one particular implementation, the applications 110 represent a web browser, web platform, or other application that can be leveraged to browse websites 116 over the network 114.

The communication module 112 is representative of functionality for enabling the client device 102 to communicate over wired and/or wireless connections. For instance, the communication module 112 represents hardware and logic for communicating data via a variety of different wired and/or wireless technologies and protocols.

The client device 102 further includes a display device 118, the input module 106, and input mechanisms 120. The display device 118 generally represents functionality for visual output for the client device 102. Additionally, the display device 118 represents functionality for receiving various types of input, such as touch input, pen input, touchless proximity input, and so forth via one or more of the touch surfaces 104a, 104b. The input module 106 is representative of functionality to enable the client device 102 to receive input (e.g., via the input mechanisms 120) and to process and route the input in various ways.

The input mechanisms 120 generally represent different functionalities for receiving input to the client device 102, and include a digitizer 122 and touch input devices 124. Examples of the input mechanisms 120 include gesture-sensitive sensors and devices (e.g., such as touch-based sensors), a stylus, a touch pad, accelerometers, a microphone with accompanying voice recognition software, and so forth. The input mechanisms 120 may be separate or integral with the display device 118; integral examples include gesture-sensitive displays with integrated touch-sensitive sensors. The digitizer 122 represents functionality for converting various types of input to the display device 118 and the touch input devices 124 into digital data that can be used by the client device 102 in various ways.

The network 114 may be implemented in various ways, such as a wired network, a wireless network, and combinations thereof. In at least some implementations, the network 114 represents the Internet. For instance, the applications 110 may be leveraged to browse websites 116 that are accessible via the network 114.

Having described an example environment in which the techniques described herein may operate, consider now a discussion of some example implementation scenarios in accordance with one or more implementations.

Example Implementation Scenarios

This section describes some example implementation scenarios for a gesture language for a device having multiple touch surfaces in accordance with one or more implementations. The implementation scenarios may be implemented in the environment 100 described above, the system 900 of FIG. 9, and/or any other suitable environment. The implementation scenarios and procedures, for example, describe example operations of the client device 102.

Figure 2:
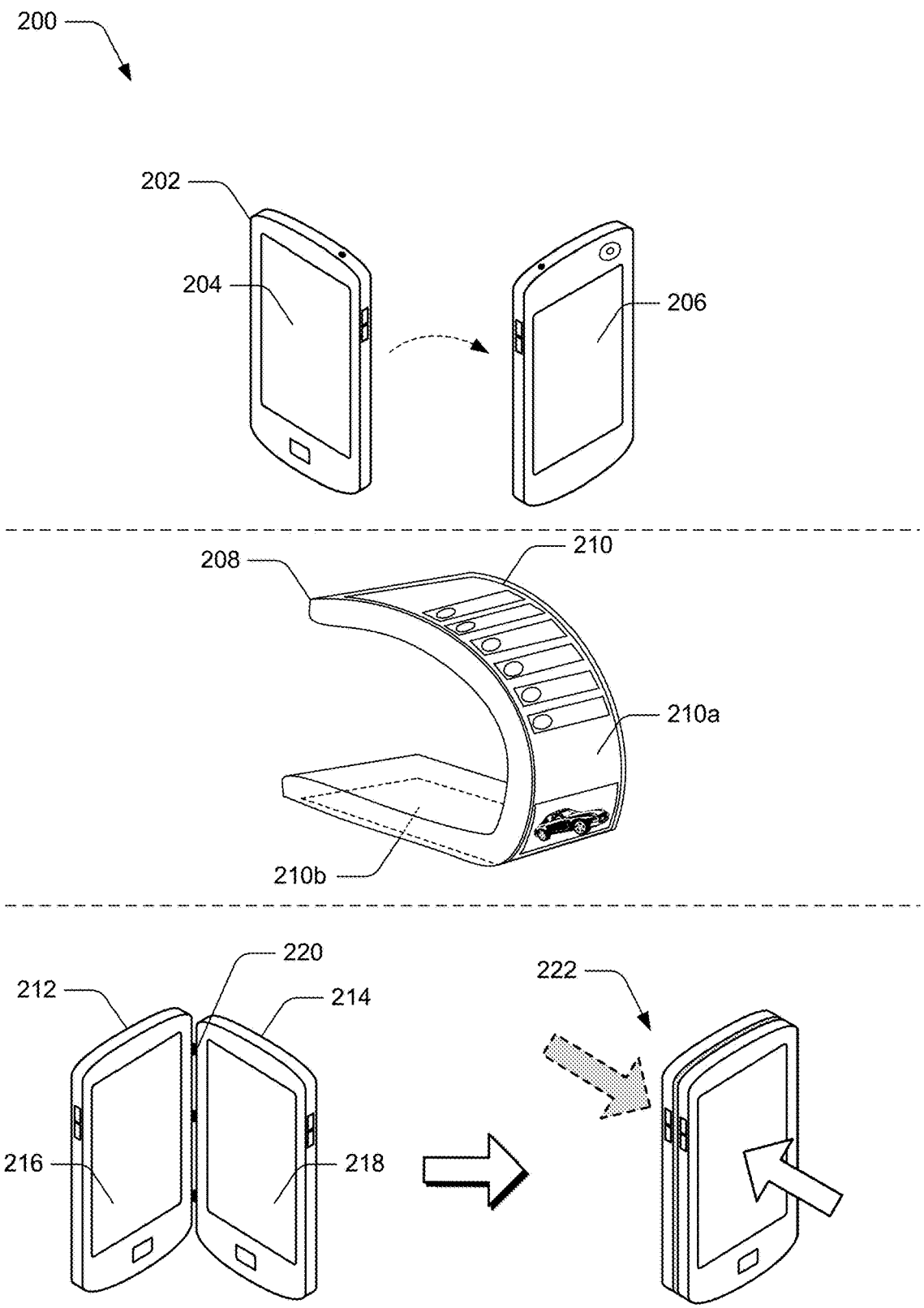
FIG. 2 depicts example implementation scenarios for a gesture language for a device with multiple touch surfaces in accordance with one or more implementations.

FIG. 2 depicts example implementation scenarios 200 of devices that include functionality for a gesture language for a device with multiple touch surfaces as described herein. The scenarios 200 include various different configurations of devices having multiple touch surfaces. The devices discussed in the scenarios 200, for instance, represent different instances of the client device 102.

For example, a device, such as mobile device 202, includes a touch-sensitive display 204 (e.g., gesture-sensitive display or surface) on a front side of the mobile device 202. In addition, the mobile device 202 includes a back surface 206, which is configured as a touch-sensitive surface on a back side of the mobile device 202 and faces a direction that is opposite to that of the touch-sensitive display 204. In some implementations, the back surface 206 is a touchpad. Alternatively or additionally, the back surface 206 can be implemented as a display with touch sensors configured to detect touch input. According to various implementations, touch input to the touch-sensitive display 204 and the back surface 206 can be interpreted according to techniques for gesture language for a device having multiple touch surfaces described herein.

The scenarios 200 include a bendable device 208 having a display device 210 disposed on a bendable material that is bendable into different configurations, causing at least a portion of the display device 210 to be hidden from the user's view. For example, the bendable device 208 can be shaped into a position having a first portion 210a of the display device 210 facing the user and a second portion 210b of the display device 210 that is non-planar with the first portion 210a, such that the second portion 210b of the display device 210 is essentially "on the backside" of the bendable device 208. In at least one implementation, the second portion 210b can be positioned normal to the first portion 210a. Accordingly, a variety of different positions and configurations of the bendable device 208 are contemplated, and are not necessarily limited to a front/back configuration. According to various implementations, touch input to the first portion 210a and the second portion 210b can be interpreted according to techniques for gesture language for a device having multiple touch surfaces described herein.

The scenarios 200 also include multiple devices 212, 214 that are physically connected to one another and include touch-sensitive displays 216, 218, respectively. In implementations, the devices 212, 214 can be connected via a movable physical connection 220, such as a hinge, a pivot, a joint, a swivel, and so on. The movable physical connection 220 can allow the devices 212, 214 to be positioned in a variety of different configurations, such as a "closed book" configuration where the displays 216, 218 face each other. Additionally, the devices 212, 214 can be positioned in an "open book" configuration where the displays 216, 218 are positioned relative to one another at an angle between zero and 90 degrees, or between 90 degrees and 360 degrees. In yet another example position, the displays 216, 218 can be parallel with one another in a side-by-side configuration where both displays 216, 218 face the same direction. In at least one implementation, the devices 212, 214 can be positioned such that the displays 216, 218 face substantially opposite directions, as illustrated in example configuration 222. According to various implementations, touch input to the displays 216, 218 can be interpreted according to techniques for gesture language for a device having multiple touch surfaces described herein.

Figure 3:
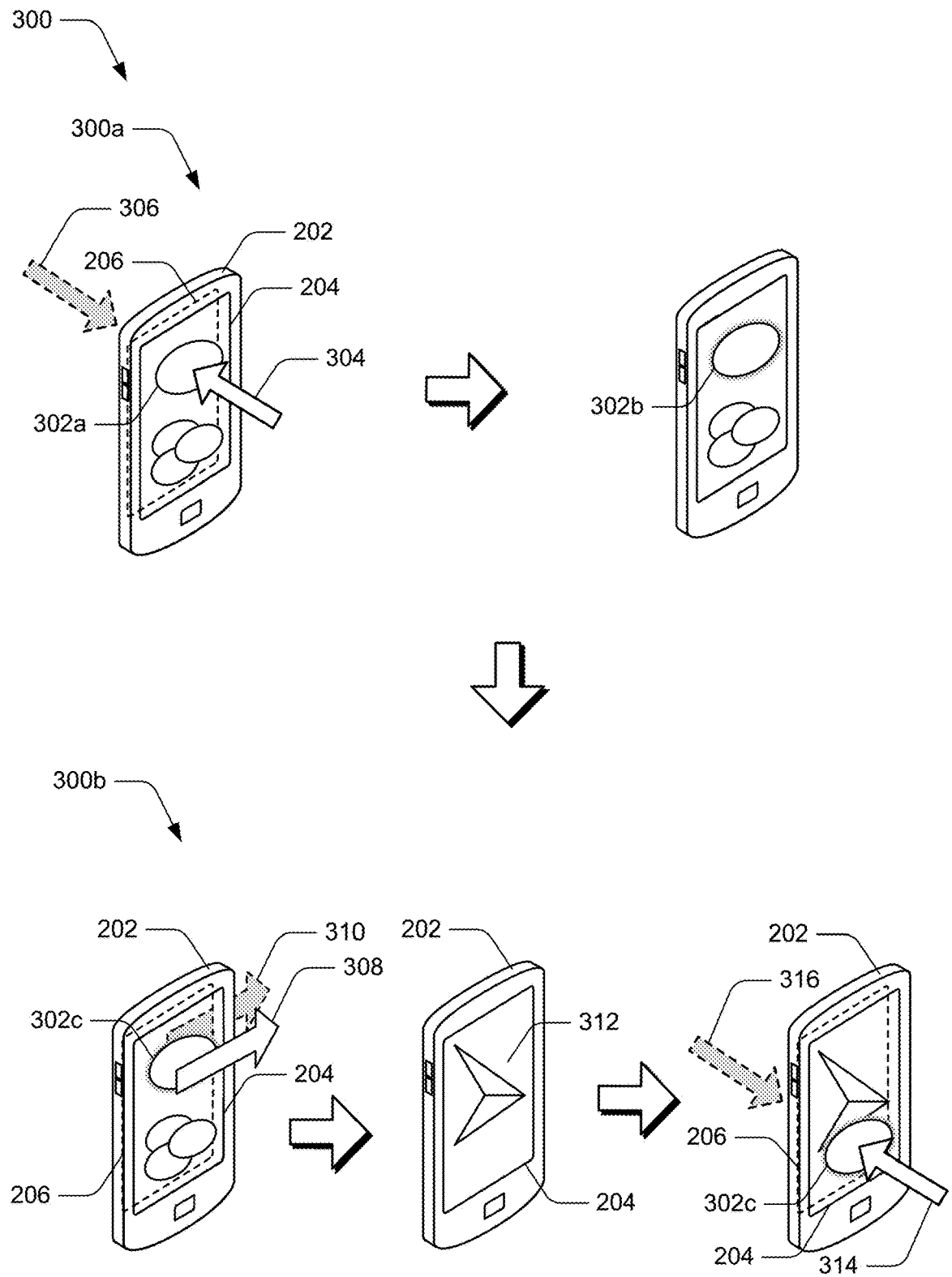
FIG. 3 depicts an example implementation scenario for a gesture language for a device with multiple touch surfaces in accordance with one or more embodiments.

FIG. 3 depicts example implementation scenarios 300 for a gesture language for a device with multiple touch surfaces in accordance with one or more implementations. In one example implementation, a user may effectively "pinch" the mobile device 202, such as in a scenario 300a. A pinch gesture includes two touch points, each on a different touch surface, that are both spatially and temporally correlated by the device. For instance, in the scenario 300a, a user applies a pinch gesture with a thumb and index finger at touch points on the display 204 and the back surface 206 correlating to an object 302a that is displayed on the display 204. This pinch gesture, represented by arrows 304, 306 which represent approximately simultaneous touch points on both the display 204 and the back surface 206 of the mobile device 202, selects the object 302a. In at least one implementation, the object 302a can be visually modified to visually indicate that the object 302a has been selected, such as by highlighting the object to provide a selected object 302b that is visually altered. The user may then release the pinch and the object 302a remains selected as the selected object 302b. In this way, the device enables the user to initiate other operations with respect to the selected object 302b.

Alternatively or additionally, the user may perform a pinch and drag gesture, such as in scenario 300b. For example, pinching the object 302a as described above detaches the object 302a from its current position on the display 204 to provide a detached object 302c. Then, while both fingers remain in a state of touching the mobile device 202, the user may slide their fingers along the surfaces, with both fingers aligned to drag the detached object 302c to different locations or regions of the user interface. An example of this drag gesture is illustrated by arrows 308, 310, which represent contact points and movement of a gesture applied to both the display 204 and the back surface 206 of the mobile device 202. This gesture drags the detached object 302c with both fingers to another location within the display.

In some implementations, the user may drag the detached object 302c conceptually off the edges of the display 204. This interaction can be interpreted as a copy operation to copy content to a temporary memory, such as a clipboard. For example, the user can drag the detached object 302c off the edge of the display 204 to copy the detached object 302c to the clipboard. Then, the user can pinch the mobile device 202 in another location to paste the detached object 302c at that location. In at least one implementation, the user may switch to a different context (e.g., a different application), such as context 312 displayed on mobile device 202, after dragging the detached object 302c off an edge of the display 204. Once the context 312 is opened and displayed, the user may perform another gesture to paste the copied content into the context 312. For example, the user may pinch the mobile device 202 at touch points represented by an arrow 314 on the display 204 and an arrow 316 on the back surface 206 to paste the object 302c into the context 312. Alternatively or additionally, if the back surface 206 includes a touch display, the user can flip the mobile device 202 over and paste the object 302c on the backside touch display.

In another example, a dual-surface pinch-and-drag gesture such as described above can be used to change a current view, to resize, rotate, delete, or manipulate content, and so on. Alternatively, a dual-screen tap gesture can be used to select an object in a context where a single-screen tap is interpreted to activate the object. Accordingly, a variety of different operations can be performed using a dual-surface pinch gesture and/or drag gesture.

The scenario 300 represents example scenarios for aligned dual-surface pinch gestures. These interactions begin with simultaneous correlated touch points (e.g., touch points represented by arrows 304, 306) on both surfaces (e.g., display 204 and back surface 206). In at least one implementation, the interactions can then continue with an aligned gesture movement (e.g., movement represented by arrows 308, 310) on both surfaces. Both the position of each touch point and the timing between the touch points is considered by the system to disambiguate the dual-surface pinch gesture from conventional touch input. For example, spatial information associated with the positions of the touch points (e.g., arrows 304, 306) on each surface is combined with temporal information associated with a duration of time occurring between non-simultaneous touch points received by the system on each surface. Combining the spatial information with the temporal information enables the system to reliably disambiguate those gestures from other user interactions, such as traditional touch gestures or single-screen touch gestures via the display 204, or inadvertent touch events via the back surface 206 that might be caused by changing the user's grip on the device.

Figure 4:
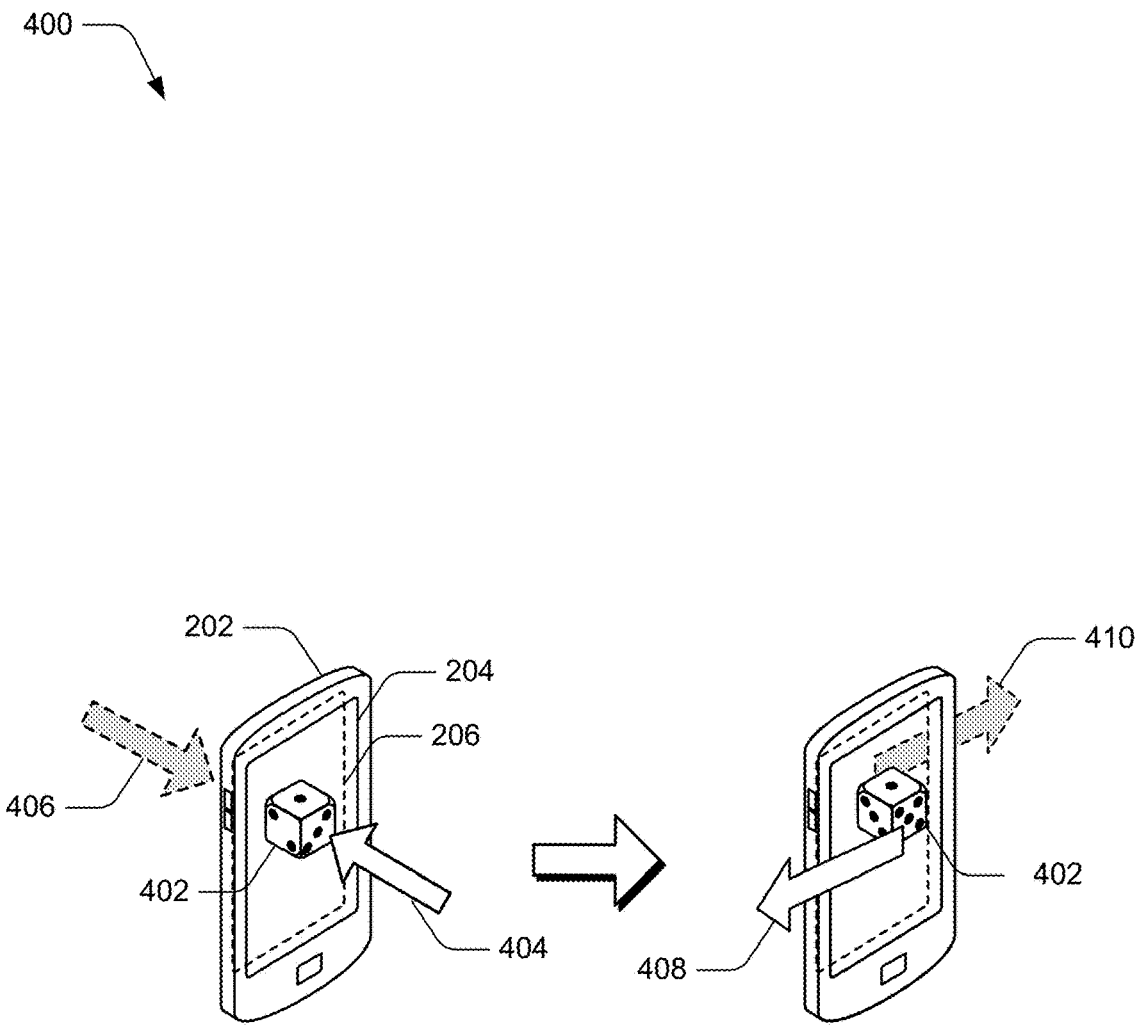
FIG. 4 depicts an example implementation scenario which represents non-aligned dual-surface gestures in accordance with one or more embodiments.

FIG. 4 depicts an example implementation scenario 400 which represents non-aligned dual-surface gestures in accordance with one or more implementations. For example, a representation of a three-dimensional (3D) object 402 is displayed via the touch-sensitive display 204 of the mobile device 202. In implementations, non-aligned dual-surface gestures can begin with a simultaneous correlated touch points on both the display 204 and the back surface 206, and then continue with non-aligned gesture movement on one or both surfaces. For instance, in at least one implementation, a user pinches the object 402 with substantially simultaneous touch inputs 404, 406, and then moves the touch inputs 404, 406 in opposite directions on each surface. For example, gesture movement can include moving the touch input 404 on the display 204 to the left while moving the touch input 406 on the back surface 206 to the right, as illustrated by arrows 408, 410, respectively. These two gestures can cause the object 402 to flip or rotate in a corresponding direction. For example, the object 402 is illustrated as a 3D die with 1-, 2-, and 3-sides showing. By performing the non-aligned dual-surface gesture represented by the arrows 408, 410, the 3D die is rotated to show a different arrangement of sides of the die. In the illustrated example, the object 402 has been rotated to show the 1-, 3-, and 5-sides of the die.

In another example, the non-aligned dual-surface gesture can be used to flip an object to view content on the back side of that object. This can be referred to as a "coin flip" because it is similar to flipping a coin to view content on the reverse side. Any piece of content can be flipped to view additional content on the reverse side of that piece of content. The additional content can include a variety of different data, such as metadata describing the object, user annotations associated with the object, related content, contextual actions, insights about the object provided by a digital agent, and so on. This provides content developers with potentially additional space usable to display information or other content to the user without cluttering the display area.

Figure 5:
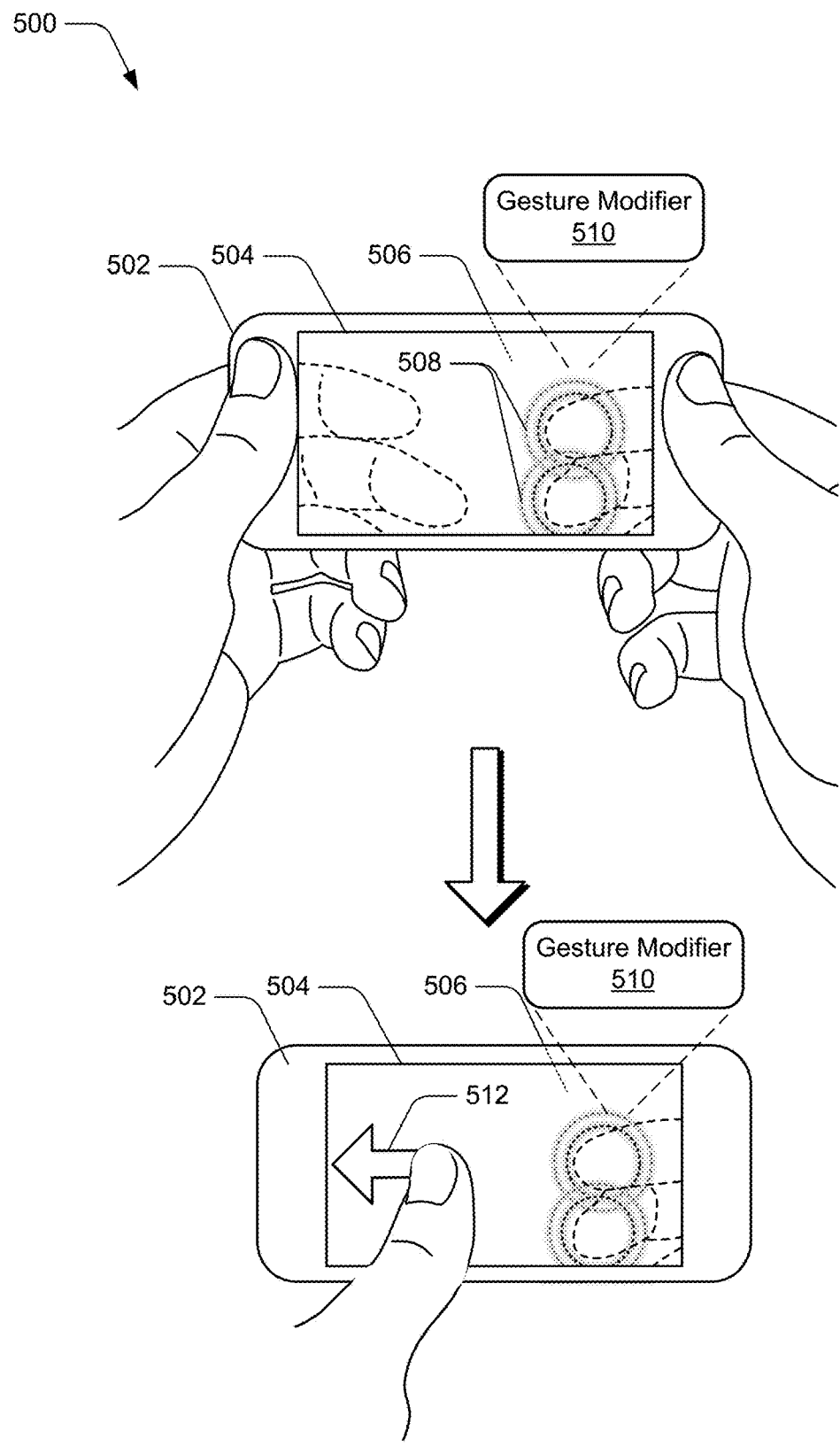
FIG. 5 depicts an example implementation scenario which represents a dual-surface gesture modifier in accordance with one or more embodiments.

FIG. 5 depicts an example implementation scenario 500 which represents a dual-surface gesture modifier in accordance with one or more implementations. The scenario 500 includes a mobile device 502, which represents an instance of the client device 102. The mobile device 502 includes a first surface 504 and a second surface 506 opposite the first surface 504. The first surface 504 and the second surface 506, for instance, represent a front surface and a back surface of the mobile device 502, respectively, or vice-versa.

In the scenario 500, the second surface 506 of the mobile device 502 is used to trigger a gesture modifier, which places the other surface and/or the input module 106 configured to process input received via the other surface, in a temporary mode that changes the interpretation of touch inputs on that surface. This can be compared to pressing and holding down the Shift key or the Ctrl key on a keyboard while pressing other keys. For example, in a word processor, pressing the "s" key causes the letter "s" to be entered in the currently displayed document, whereas holding the Ctrl key first and then pressing the "s" key causes the system to interpret the interaction differently and save the document instead.

For instance, the user interacts with the second surface 506 by holding two fingers on the second surface 506 at touch points 508, which in this implementation is interpreted as a gesture modifier 510. Then, the user interacts with the first surface 504 by performing a gesture 512. The gesture 512, for instance, represents a swipe gesture. A conventional swipe gesture might scroll a list or navigate to a next/previous image. Performing the same swipe gesture (e.g., the gesture 512), however, while performing the gesture modifier 510 via the second surface 506 can initiate a different action than a swipe gesture alone, such as scrolling the list by a different amount, jumping to a different category or section of the list, zooming the list, modifying the list, sorting the list, filtering the list, commanding on the list, and so on.

According to various implementations, the gesture modifier 510 is mapped to a gesture performed on the second surface 506. Examples of the gesture modifier 510 include touching the second surface 506 with a particular finger or a particular number of fingers, or swiping the second surface 506 with one or more fingers. Another example includes tapping a particular number of times on the second surface 506 rather than touching and holding the second surface 506. Further, multiple different temporary modes can be initiated using different gesture modifiers, such as using one versus two touch points on the second surface 506, or a tap versus a swipe on the second surface 506. Accordingly, any of a variety of different gestures on one surface of the mobile device 502 can be used as modifiers to change the mode of interpretation of gestures on another surface of the mobile device 502. While the scenario 500 is described as using the second surface 506 to perform the gesture modifier 510, it is also contemplated that the gesture modifier 510 can be performed via the first surface 504 to place the second surface 506 in the temporary mode that changes the interpretation of touch inputs on the second surface 506.

Figure 6:
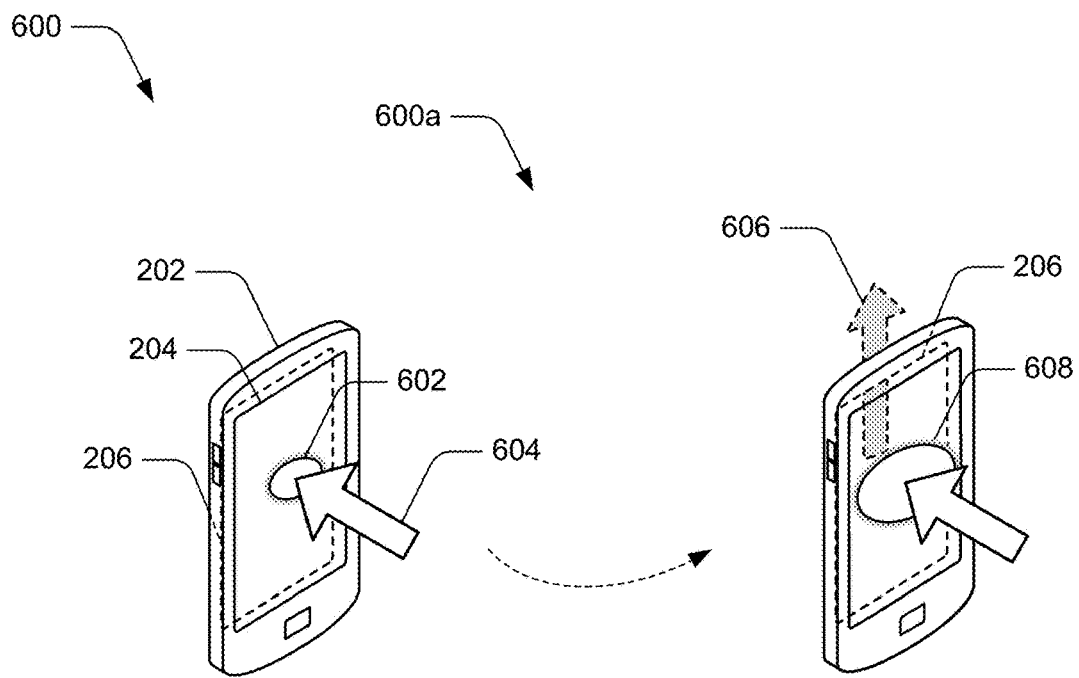
FIG. 6 depicts an example implementation scenario which represents a dual-surface targeted gesture in accordance with one or more embodiments.
Figure 6:
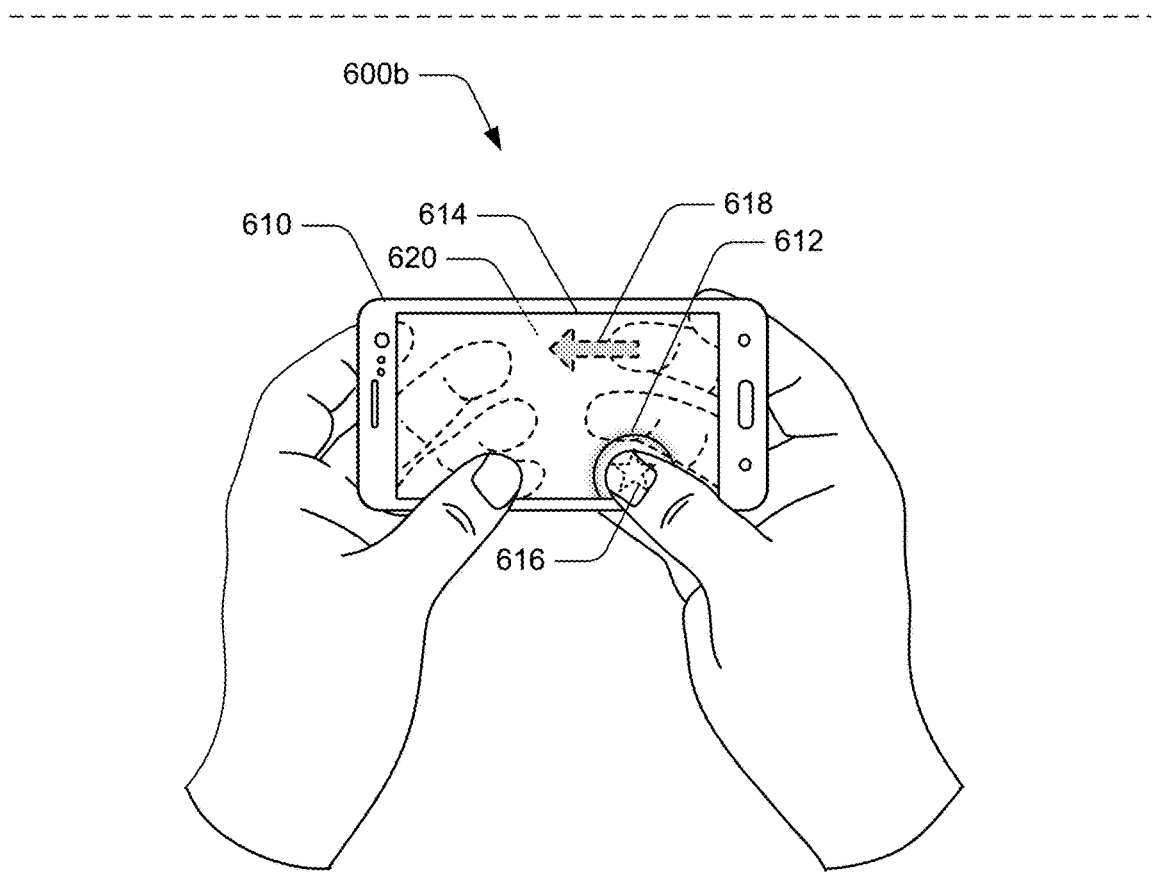

FIG. 6 depicts example implementation scenarios 600 which represents a dual-surface targeted gesture in accordance with one or more implementations. The scenarios 600 include a scenario 600a and a scenario 600b.

In the scenario 600a, one of the display 204 or the back surface 206 is used to establish a target of an operation and the other of the display 204 or the back surface 206 is used to establish the command of the operation. In a speech command context, for example, a first surface gesture establishes a noun, while a second surface gesture establishes a verb indicating an action in relation to the noun. Accordingly, the display 204 and back surface 206 can serve different complementary functions in this interaction model.

In at least one implementation, the target of a command is a digital photo, and the operation or command to be performed on the photo is adding the photo to a collection, resizing the photo, rotating the photo, sharing the photo with a friend, deleting the photo, and so on. Accordingly, a set of different contextual commands can all be applicable to the same context (e.g., different commands applied to the same object). In the scenario 600a, for instance, the mobile device 202 is illustrated as displaying an object 602 (e.g., a photo) on the display 204. The user touches the display 204 at the location of the object 602 to specify the object, such as by performing a gesture 604. The gesture 604 can be implemented in various ways, such as pressing and holding the object 602, tapping the object 602, double-tapping the object 602, and so on. Then, with the object 602 specified, a gesture 606 (e.g., a directional swipe) is performed on the back surface 206, and the gesture 606 is mapped to a particular command. In the illustrated example, the gesture 606 maps to a resizing command to enlarge the object 602 that was specified using gesture 604 to provide an enlarged object 608.

In another example, swiping to the right in the context of a photo can indicate that the photo is to be shared, but swiping to the right in a different context may have a different interpretation. This allows the same family of gesture input on the side that is performing the commands to have a different interpretation based on the context.

In yet another example, a context menu can be displayed based on a conventional right-click on an object or press-and-hold on the object 602. Generally, the context menu includes a number of commands that can be performed in relation to the particular context. The techniques described herein can essentially create shortcuts to those operations that generally appear in the context menu. For example, rather than performing various different steps to open the context menu, navigate through a user interface, and perform an operation, the operations in the context menu can be initiated with a single step using a dual-surface gesture modifier. Additionally, the context menu can be used to teach the user about available gesture shortcuts and their corresponding behaviors.

Scenario 600b, for instance, includes mobile device 610, which represents an instance of the client device 102. While holding mobile device 610, the user presses and holds a touch point 612 on a front display 614 corresponding to an object 616, which is not shown because the object 616 is occluded by the user's thumb, but is indicated via dashed lines to indicate a position of the object 616 under the user's thumb. While holding the object 616 via the front display 614, the user performs a directional swipe 618 via a back surface 620 of the mobile device 610 with another finger.

This gesture can perform any of a variety of different operations on the selected object, such as resize, unpin, pin, flip a state, mark/unmark as a favorite, share, rotate, copy, delete, and so on. By simultaneously specifying the object and the command with the dual-surface targeted gestures, individual operations in the context menu can be initiated with a single step.

Having described some example implementation scenarios, consider now some example procedures for a gesture language for a mobile device with multiple touch surfaces in accordance with one or more implementations.

Example Procedures

The following discussion describes example procedures for a gesture language for a device with multiple touch surfaces in accordance with one or more implementations. The example procedures may be employed in the environment 100 of FIG. 1, the system 900 of FIG. 9, and/or any other suitable environment. The procedures, for instance, represents procedures for implementing the example implementation scenarios discussed above. In at least some implementations, the steps described for the various procedures can be implemented automatically and independent of user interaction.

Figure 7:
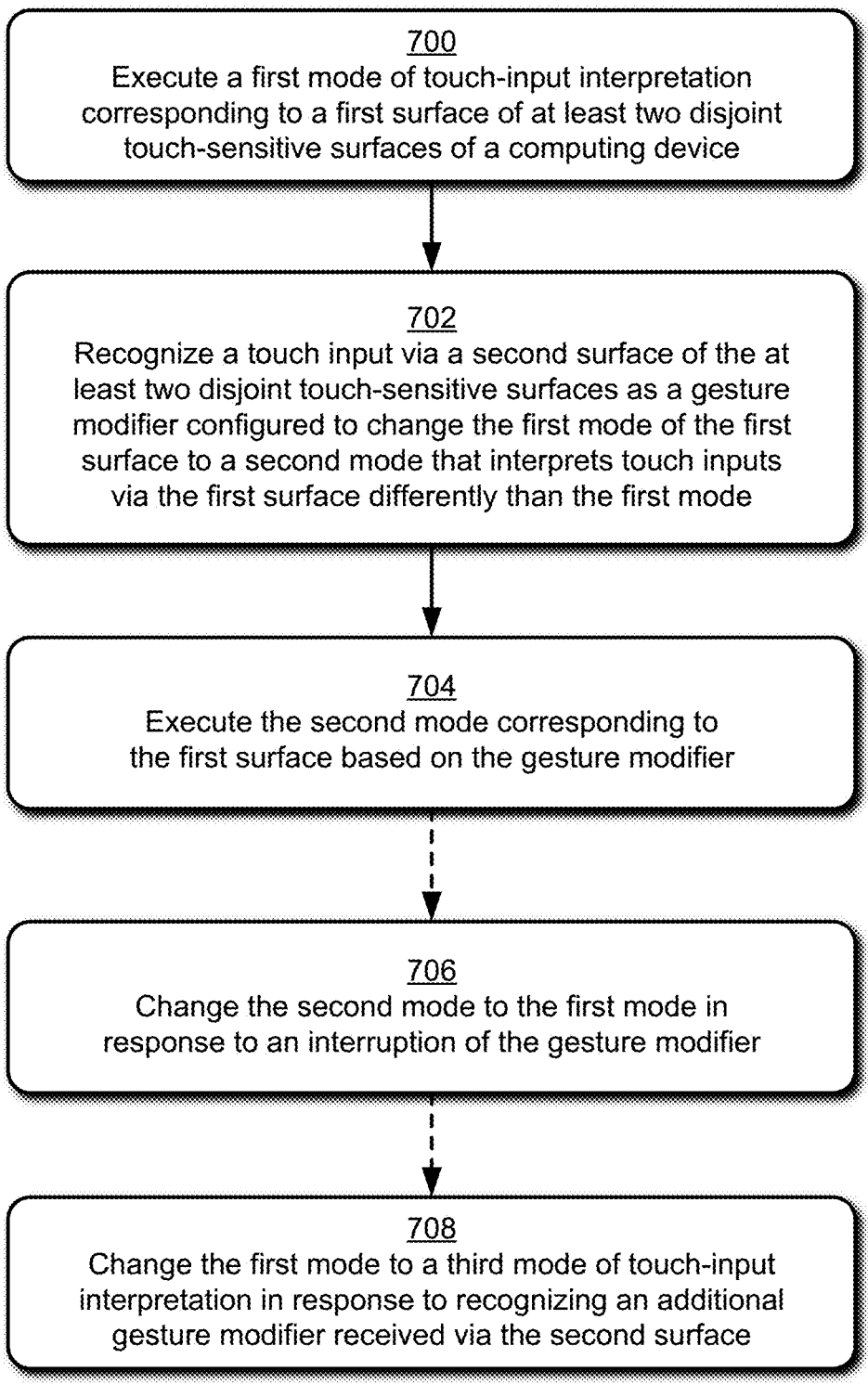
FIG. 7 is a flow diagram that describes steps in a method in accordance with one or more embodiments.

FIG. 7 is a flow diagram that describes steps in a method in accordance with one or more implementations. The method, for instance, describes an example procedure for a gesture language for a device with multiple touch surfaces in accordance with one or more implementations.

Step 700 executes a first mode of touch-input interpretation corresponding to a first touch-sensitive surface of at least two disjoint touch-sensitive surfaces of a computing device. The client device 102, for instance, executes a mode of interpreting touch inputs a first surface, such as a front display. The mode represents a set of mappings between gestures and operations.

Step 702 recognizes a touch input via a second surface of the at least two disjoint touch-sensitive surfaces as a gesture modifier configured to change the first mode of the first surface to a second mode that interprets touch inputs via the first surface differently than the first mode. For example, the client device 102 can receive a touch input via the back surface 206. The touch input can include any of a variety of gestures, such as a tap, double-tap, directional swipe, multi-finger tap or swipe, and so on. The second mode and the first mode are configured to interpret the same touch input differently. For example, a directional swipe in the first mode via the first surface can be interpreted to navigate a currently displayed photo to a next photo in a group of photos. Using the second mode, however, the same directional swipe via the first surface can be interpreted to resize or rotate the photo. Accordingly, different modes of touch-input interpretation map the same group of gestures to different operations, and each mode can be initiated based on a different gesture modifier. Utilizing multiple different modes that are accessible each with a different gesture modifier extends a number of operations that are directly available to a user and which are accessible without resorting to additional onscreen user interfaces used by traditional nesting menus.

Step 704 executes the second mode corresponding to the first surface based on the gesture modifier. The client device 102, for example, changes the mode of touch-input interpretation of the front surface based on the gesture modifier recognized via the back surface. This can be analogized to conventional Shift, Ctrl, and Alt keys on a keyboard that modify operations associated with particular keys on the keyboard.

Optional step 706 changes the second mode to the first mode in response to an interruption of the gesture modifier. For example, once the user releases the touch input on the back surface 206, such as by lifting their finger(s), the gesture modifier is interrupted or canceled. Based on this, the mode of the first surface can return to a default mode. Alternatively, the mode can return to the default mode after expiration of a duration of time, or based on an additional gesture modifier received via the back surface 206.

Optional step 708 changes the first mode to a third mode of touch-input interpretation in response to recognizing an additional gesture modifier received via the second surface. The mobile device 202 can recognize, for instance, a different gesture modifier via the back surface 206 that is mapped to an alternative mode corresponding to the first surface. In at least one implementation, the additional gesture modifier corresponding to the third mode can include a three-finger double-tap in contrast to a single finger double-tap corresponding to the gesture modifier for the second mode. Any of a variety of different gestures can be used as the additional gesture modifier corresponding to the third mode.

Figure 8:
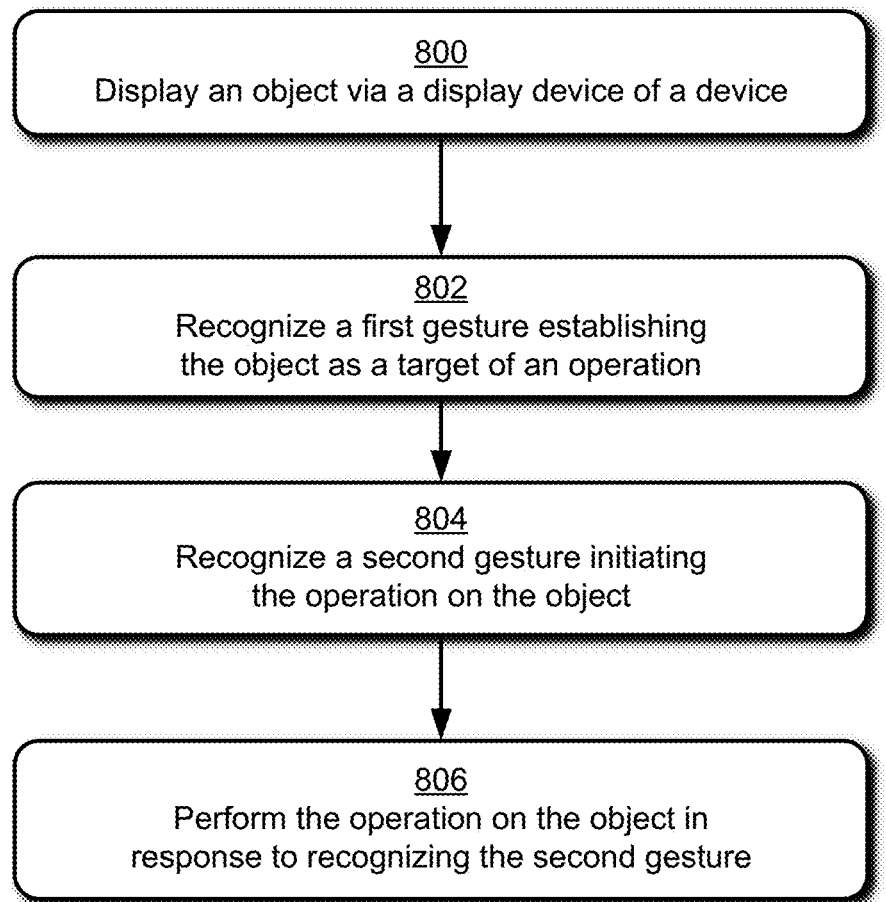
FIG. 8 is a flow diagram that describes steps in a method in accordance with one or more embodiments.

FIG. 8 is a flow diagram that describes steps in a method in accordance with one or more implementations. The method, for instance, describes an example procedure for a gesture language for a device with multiple touch surfaces in accordance with one or more implementations.

Step 800 displays an object via a display device of a computing device. In implementations, the display device is configured as a first touch-sensitive surface that is disjoint from a second touch-sensitive surface of the mobile device. For example, the mobile device 202 can include two display devices that face different directions from one another, such as opposite directions. Alternatively, the mobile device 202 can include the display device disposed on a front surface and a touchpad disposed on a back surface. A variety of different configurations are contemplated for a device having two disjoint touch-sensitive surfaces, examples of which are discussed above.

Step 802 recognizes a first gesture establishing the object as a target of an operation. In implementations, a first touch input is received via the first touch-sensitive surface and recognized as the first gesture. For example, in the scenario 600b in FIG. 6, the first gesture includes a tap-and-hold gesture at the touch point 612, which is associated with a location of the object 616 displayed via the front display 614 of the mobile device 610. This gesture is recognized as selecting the object 616 and establishing the object as the target of an operation.

Step 804 recognizes a second gesture initiating the operation on the object. In implementations, a second touch input is received via the second touch-sensitive surface while the object is selected via the first touch-sensitive surface, and the second touch input is recognized as the second gesture. Continuing with the example from scenario 600b, the second gesture can include the directional swipe 618 gesture received via the back surface 620 of the mobile device 610. The directional swipe 618 received via the back surface 620 can be mapped to a variety of different operations that are performable in relation to the selected object 616, examples of which are described above.

Step 806 performs the operation on the object in response to recognizing the second gesture. For example, the second gesture can be mapped to a particular operation, and the operation can be performed in relation to the target that was selected using the first gesture via the front display of the mobile device. In implementations, the operation is performed on the selected object based on the second touch input received via the second touch-sensitive surface.

Having described some example procedures for a gesture language for a device with multiple touch surfaces, consider now some further implementation details in accordance with one or more implementations.

Implementation Details

Generally, techniques for gesture language for a device with multiple touch surfaces described herein enable, as part of the gesture language:
Input control based on back touch interactions with a touch-sensitive input surface on the backside of a mobile device, positioned opposite the primary display
Extension of gesture languages to simultaneous touch input on a forward-facing touchscreen and a rear surface to enable additional categories of gesture interactions
Extension of gesture languages without conflicting with existing gesture language models, such as single surface gesture language models
Specific simultaneous touch model using "pinch" gestures that begin with simultaneous correlated touch points on both surfaces and continue with aligned gesture movement on both surfaces (e.g., pinch and drag)
Specific simultaneous touch model using "pinch" gestures that begin with simultaneous correlated touch points on both surfaces and continue with non-aligned gesture movement on both surfaces (e.g., "coin flip")
Alternative use for gesture modifiers performed on one side that place the opposite input surface into a temporary mode that changes interpretation of touch input Accordingly, techniques described herein provide new and more efficient ways for users to interact with devices that have multiple touch surfaces without conflicting with existing gesture input models. Additionally, the techniques described herein improve the user experience by extending the number and type of gesture inputs recognizable by these devices. Further, these additional gesture inputs can be used as shortcuts to perform a variety of operations that would otherwise require several navigational steps to initiate, thereby increasing efficiency and reducing the time used to navigate to and initiate various commands.

Having described some example implementation details, consider now a discussion of an example system and device in accordance with one or more implementations.

Example System and Device

Figure 9:
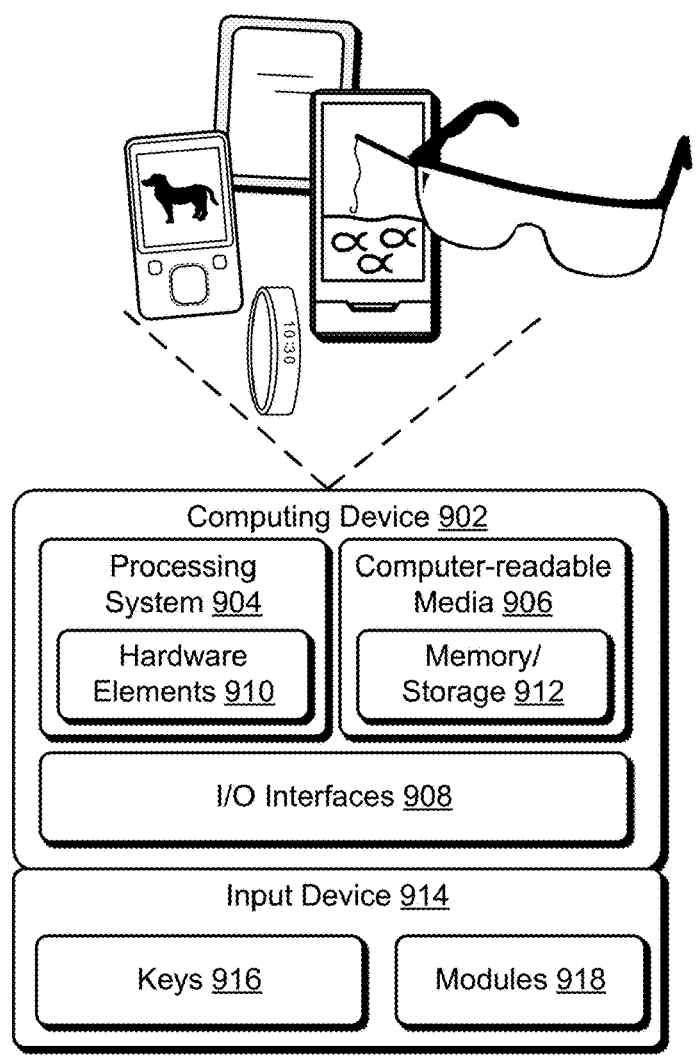
FIG. 9 illustrates an example system including various components of an example device that can be implemented as any type of computing device as described with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. In at least some implementations, the computing device 902 represents an implementation of the client device 102 discussed above. The computing device 902 may be, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the client device 102 may be implemented as a wearable device, such as a smart watch, smart glasses, a dual surface gesture-input peripheral for a computing device, and so forth.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways to support user interaction.

The computing device 902 is further illustrated as being communicatively and physically coupled to an input device 914 that is physically and communicatively removable from the computing device 902. In this way, a variety of different input devices may be coupled to the computing device 902 having a wide variety of configurations to support a wide variety of functionality. In this example, the input device 914 includes one or more keys 916, which may be configured as pressure sensitive keys, mechanically switched keys, and so forth.

The input device 914 is further illustrated as include one or more modules 918 that may be configured to support a variety of functionality. The one or more modules 918, for instance, may be configured to process analog and/or digital signals received from the keys 916 to determine whether a keystroke was intended, determine whether an input is indicative of resting pressure, support authentication of the input device 914 for operation with the computing device 902, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media and does not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

Implementations Discussed Herein Include

Example 1

A system for performing an operation based on a dual-surface interaction model, the system comprising: a touch-sensitive display; a touch-sensitive surface that is disjoint from the touch-sensitive display; at least one processor; at least one computer-readable storage media storing instructions that are executable by the at least one processor to implement an input module configured to: receive a first touch input via the touch-sensitive display, the first touch input selecting an object displayed via the touch-sensitive display; receive a second touch input via the touch-sensitive surface while the object is selected via the touch-sensitive display; and perform an operation on the selected object based on the second touch input received via the touch sensitive surface.

Example 2

A system as described in example 1, wherein the touch-sensitive display is connected to the touch-sensitive surface via a movable physical connection.

Example 3

A system as described in one or more of examples 1 or 2, wherein the touch-sensitive display and the touch-sensitive surface are both disposed on a bendable material that enables the touch-sensitive display and the touch-sensitive surface to face different directions.

Example 4

A system as described in one or more of examples 1-3, wherein the touch-sensitive surface includes a display device.

Example 5

A system as described in one or more of examples 1-4, wherein the operation comprises at least one of resizing, rotating, flipping, copying, deleting, or sharing the object.

Example 6

A system as described in one or more of examples 1-5, wherein the operation comprises a context menu command and is performed without displaying a context menu.

Example 7

A system as described in one or more of examples 1-6, wherein the second touch input includes a multi-finger gesture performed via the touch-sensitive surface.

Example 8

A method implemented by a computing device for switching between modes of touch-input interpretation, the method comprising: executing a first mode of touch-input interpretation corresponding to a first surface of at least two disjoint touch-sensitive surfaces of the computing device; recognizing a touch input via a second surface of the at least two disjoint touch-sensitive surfaces as a gesture modifier configured to change the first mode of the first surface to a second mode that interprets touch inputs via the first surface differently than the first mode; and executing the second mode corresponding to the first surface based on the gesture modifier.

Example 9

A method as described in example 8, wherein the first surface and the second surface are disposed on opposite sides of the computing device.

Example 10

A method as described in one or more of examples 8 or 9, wherein the first surface is disposed on a first member that is hingedly connected to a second member having the second surface.

Example 11

A method as described in one or more of examples 8-10, wherein both the first surface and the second surface include display devices.

Example 12

A method as described in one or more of examples 8-11, further comprising changing the second mode to the first mode in response to an interruption of the gesture modifier.

Example 13

A method as described in one or more of examples 8-12, wherein the second surface is disposed on a back side of the computing device and faces away from a user when the first surface is facing the user.

Example 14

A method as described in one or more of examples 8-13, further comprising changing the second mode to a third mode of touch-input interpretation in response to recognizing an additional touch input received via the second surface as an additional gesture modifier that is mapped to the third mode.

Example 15

A method implemented by a device, the method comprising: displaying an object via a display device of the device; recognizing a first gesture establishing the object as a target of an operation, the first gesture based on a first input received via a first gesture-sensitive surface of the device; recognizing a second gesture initiating the operation on the object, the second gesture based on a second input received via a second gesture-sensitive surface of the device that is disjoint from the first gesture-sensitive surface of the device; and performing the operation on the object in response to recognizing the second gesture.

Example 16

A method as described in example 15, wherein the operation is performed based on recognizing the second gesture and during the first gesture.

Example 17

A method as described in one or more of examples 15 or 16, wherein the gesture-sensitive display is connected to the gesture-sensitive surface via a movable physical connection.

Example 18

A method as described in one or more of examples 15-17, wherein the gesture-sensitive display and the gesture-sensitive surface are both disposed on a bendable material that enables the gesture-sensitive display and the gesture-sensitive surface to face different directions.

Example 19

A method as described in one or more of examples 15-18, wherein the operation comprises at least one of resizing, rotating, flipping, copying, deleting, or sharing the object.

Example 20

A method as described in one or more of examples 15-19, wherein the second gesture includes a multi-finger gesture performed via the gesture-sensitive surface.

CONCLUSION

Techniques for a gesture language for a device with multiple touch surfaces are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed subject matter, and other equivalent features and methods are intended to be within the scope of the appended claims. Further, various different embodiments are described and it is to be appreciated that each described embodiment can be implemented independently or in connection with one or more other described embodiments.

What is claimed is:

1. A computer-readable storage device storing computer-executable instructions that, when executed by at least one processor, causes the at least one processor to execute a method comprising:
  executing a first mode of touch-input interpretation that interprets touch input received on the first touch-sensitive display associated with a computing device;
  receiving a first touch input via the first touch-sensitive display and a second touch-sensitive display associated with the computing device, wherein the first touch input comprises a gesture having a first touch point on the first touch-sensitive display and a second touch point on the second touch-sensitive display, and wherein the gesture is selected from a group that comprises: a pinch gesture, a swipe gesture, and a multi-finger tap gesture;
  determining that the gesture is a gesture modifier configured to change the first touch-sensitive display from the first mode of touch input-interpretation to a second mode of touch input-interpretation that interprets a subsequent touch input, receivable via the first touch-sensitive display, differently than the first mode of touch-input interpretation; and
  toggling the first touch-sensitive display from the first mode of touch input-interpretation to the second mode of touch input-interpretation based on a determination that the gesture is the gesture modifier, wherein the toggling configures the first touch-sensitive display so that receipt of the subsequent touch input is interpreted differently from an interpretation provided through the first mode.

2. The computer-readable storage device as described in claim 1, wherein the executed method further comprising: receiving a second touch input, on the first touch-sensitive display, that modifies a displayed object while the first touch-sensitive display is operating in the second mode of touch input-interpretation; and modifying the displayed object based the received second touch input and application of the second mode of touch input interpretation, and wherein the second mode of touch input-interpretation is configured to modify the displayed object by at least one of resizing, rotating, flipping, copying, deleting, or sharing the displayed object, based on application of the second mode of touch input-interpretation.

3. The computer-readable storage device as described in claim 1, wherein the first touch input is one selected from a group that comprises: a tap gesture, a double-tap gesture, a pinch gesture, a directional swipe and a multi-finger swipe.

4. The computer-readable storage device as described in claim 1, wherein the executed method further comprising: changing the first touch-sensitive display from the second mode to the first mode in response to detecting an interruption action of the gesture modifier received via the second touch-sensitive display.

5. The computer-readable storage device as described in claim 1, wherein the first touch-sensitive display is associated with a first display device and the second touch-sensitive display is associated with a second display device.

6. The computer-readable storage device as described in claim 1, wherein the first touch-sensitive display is disposed on a first member of a computing device that is hingedly connected to a second member having the second touch-sensitive display.

7. The computer-readable storage device as described in claim 1, wherein the first touch-sensitive display and the second touch-sensitive display are both disposed on a bendable material that enables the first touch-sensitive display and the second touch-sensitive display to face different directions.

8. The computer-readable storage device as described in claim 1, wherein the gesture initiates at the first touch point on the first touch-sensitive display and drags content from the first touch-sensitive display to the second touch-sensitive display ending at the second touch point.

9. The method as described in claim 8, wherein the first touch-sensitive display and the second touch-sensitive display are both disposed on a bendable material that enables the first touch-sensitive display and the second touch-sensitive display to face different directions.

10. The method as described in claim 8, further comprising: receiving a second touch input, on the first touch-sensitive display, that modifies a displayed object while the first touch-sensitive display is operating in the second mode of touch input-interpretation; and modifying the displayed object based the received second touch input and application of the second mode of touch input interpretation, and wherein the second mode of touch input-interpretation is configured to modify the displayed object by at least one of resizing, rotating, flipping, copying, deleting, or sharing the displayed object, based on application of the second mode of touch input-interpretation.

11. The method as described in claim 8, wherein the gesture initiates at the first touch point on the first touch-sensitive display and drags content from the first touch-sensitive display to the second touch-sensitive display ending at the second touch point.

12. The method as described in claim 8, further comprising: changing the first touch-sensitive display from the second mode to the first mode in response to detecting an interruption action of the gesture modifier received via the second touch-sensitive display.

13. The method as described in claim 8, wherein the first touch-sensitive display is associated with a first display device and the second touch-sensitive display is associated with a second display device.

14. The method as described in claim 8, wherein the first touch-sensitive display is disposed on a first member of a computing device that is hingedly connected to a second member having the second touch-sensitive display.

15. A method comprising:
  executing a first mode of touch-input interpretation that interprets touch input received on the first touch-sensitive display associated with a computing device;
  receiving a first touch input via the first touch-sensitive display and a second touch-sensitive display associated with the computing device, wherein the first touch input comprises a gesture having a first touch point on the first touch-sensitive display and a second touch point on the second touch-sensitive display, and wherein the gesture is selected from a group that comprises: a pinch gesture, a swipe gesture, and a multi-finger tap gesture;

determining that the gesture is a gesture modifier configured to change the first touch-sensitive display from the first mode of touch input-interpretation to a second mode of touch input-interpretation that interprets a subsequent touch input, receivable via the first touch-sensitive display, differently than the first mode of touch-input interpretation; and toggling the first touch-sensitive display from the first mode of touch input-interpretation to the second mode of touch input-interpretation based on a determination that the gesture is the gesture modifier, wherein the toggling configures the first touch-sensitive display so that receipt of the subsequent touch input is interpreted differently from an interpretation provided through the first mode.

16. A system comprising:
a first touch-sensitive display;
a second touch-sensitive display;
at least one processor that is connected with the first touch-sensitive display and the second touch-sensitive display;
at least one computer-readable storage media storing instructions that are executable by the at least one processor to implement an input module configured to:
  execute a first mode of touch-input interpretation that interprets touch input received on the first touch-sensitive display associated with a computing device;
  receive a first touch input via the first touch-sensitive display and a second touch-sensitive display associated with the computing device, wherein the first touch input comprises a gesture having a first touch point on the first touch-sensitive display and a second touch point on the second touch-sensitive display, and wherein the gesture is selected from a group that comprises: a pinch gesture, a swipe gesture, and a multi-finger tap gesture;
  determine that the gesture is a gesture modifier configured to change the first touch-sensitive display from the first mode of touch input-interpretation to a second mode of touch input-interpretation that interprets a subsequent touch input, receivable via the first touch-sensitive display, differently than the first mode of touch-input interpretation; and
  toggle the first touch-sensitive display from the first mode of touch input-interpretation to the second mode of touch input-interpretation based on a determination that the gesture is the gesture modifier and the subsequent touch input is interpreted differently from an interpretation provided through the first mode.

17. The system as described in claim 16, wherein the input module is further configured to: receive a second touch input, on the first touch-sensitive display, that modifies a displayed object while the first touch-sensitive display is operating in the second mode of touch input-interpretation; and modifies the displayed object based the received second touch input and application of the second mode of touch input interpretation, and wherein the second mode of touch input-interpretation is configured to modify the displayed object by at least one of resizing, rotating, flipping, copying, deleting, or sharing the displayed object, based on application of the second mode of touch input-interpretation.

18. The system as described in claim 16, wherein the gesture initiates at the first touch point on the first touch-sensitive display and drags content from the first touch-sensitive display to the second touch-sensitive display ending at the second touch point.

19. The system as described in claim 16, wherein the input module is further configured to: change the first touch-sensitive display from the second mode to the first mode in response to detecting an interruption action of the gesture modifier received via the second touch-sensitive display.

20. The system as described in claim 16, wherein the first touch-sensitive display is disposed on a first member of a computing device that is hingedly connected to a second member having the second touch-sensitive display.

* * * * *